R. S. CARSON.
LUGGAGE CARRIER FOR BICYCLES.
APPLICATION FILED MAR. 22, 1920.
1,359,329.  Patented Nov. 16, 1920.
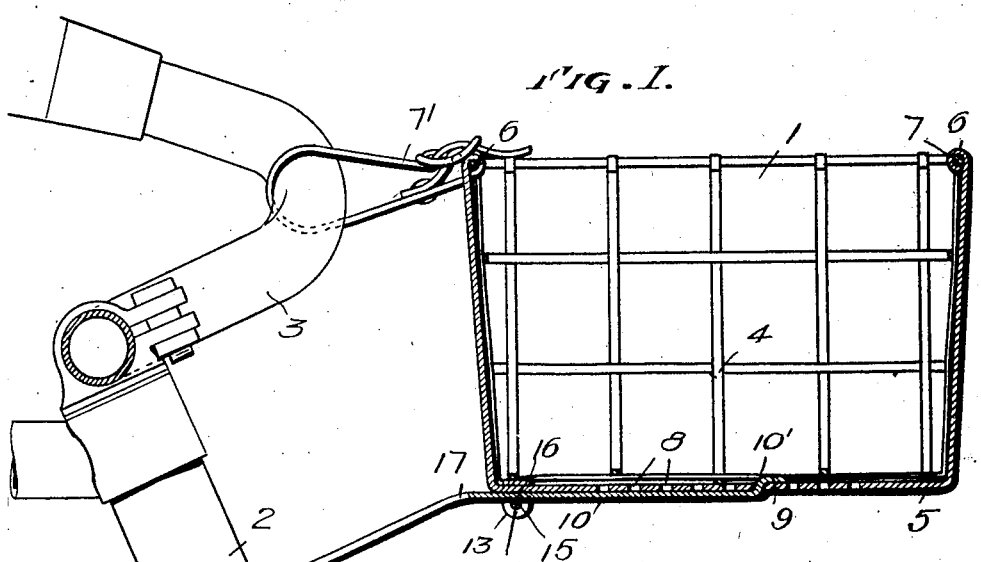
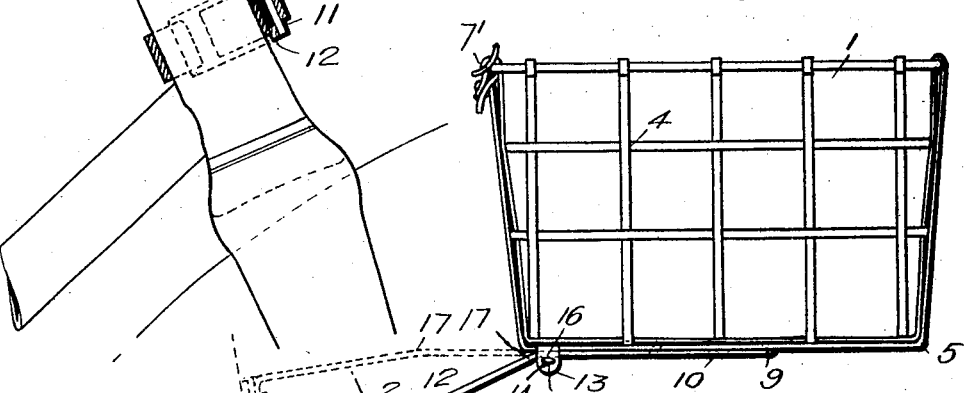
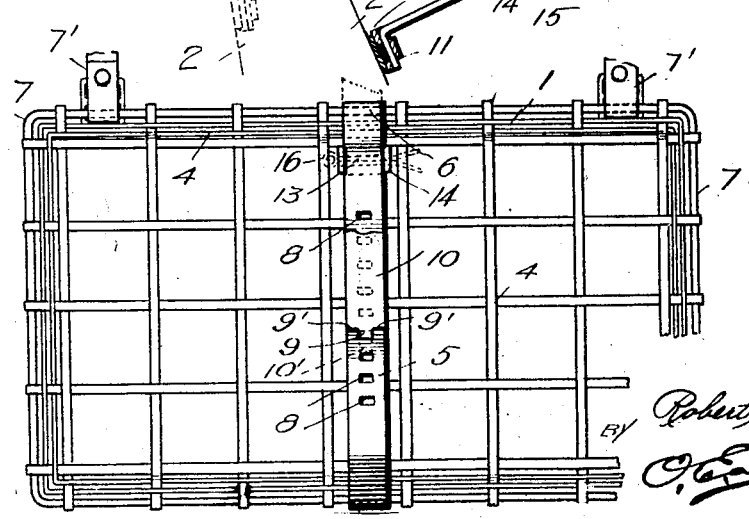

UNITED STATES PATENT OFFICE.

ROBERT SCOTT CARSON, OF LOUISVILLE, KENTUCKY, ASSIGNOR TO DOW WIRE & IRON WORKS, OF LOUISVILLE, KENTUCKY, A CORPORATION.

LUGGAGE-CARRIER FOR BICYCLES.

1,359,329.  Specification of Letters Patent.  Patented Nov. 16, 1920.

Application filed March 22, 1920. Serial No. 367,916.

*To all whom it may concern:*

Be it known that I, ROBERT SCOTT CARSON, a citizen of the United States, residing at Louisville, in the county of Jefferson and State of Kentucky, have invented certain new and useful Improvements in Luggage-Carriers for Bicycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to luggage carriers for bicycles, and has for its object to provide a carrier of simple and inexpensive construction, and which can be readily adjusted to fit different makes and heights of bicycle frames and different styles of handle-bars, so that the floor of the carrier may be positioned in proper horizontal plane.

The invention consists in the novel construction of the carrier and particularly in the adjustable construction of the attaching means.

Referring to the accompanying drawing:

Figure 1 is a side elevation of the head portion of a bicycle frame, the carrier and handle-bar being shown in section.

Fig. 2 is a bottom plan view of the carrier.

Fig. 3 is a side elevation showing in detail the adjustable support in full and dotted lines.

Like numerals of reference indicate the same parts throughout the several figures, in which:

1 indicates the luggage carrier, 2 the head of a bicycle frame and 3 the handle-bars.

The carrier 1 is constructed preferably of thin metal strips 4 interwoven and welded or otherwise suitably secured together and shaped in conventional basket form.

Centrally and transversely of the carrier is a wide stiffening and reinforcing strip 5 bent to conform to the basket and having its ends 6 bent around the metal frame 7, to which frame 7 the ends of the transverse and longitudinal members 4 are also secured. The horizontal side and end members 4 have their meeting ends preferably welded together so as to form endless members to increase the strength and durability of the device.

Referring now to the central strip 5, it will be seen that the same is provided with a series of elongated openings 8 for the selective reception of the tongue 9 of the attaching member 10; said attaching member 10 being preferably a flat metal strip terminating at its rear end in a downward bend to be received by the metal band-segment 11, said band-segment being suitably formed to receive the bicycle head-attaching strap 12. The tongue 9 of the attaching member 10 is of less width than the body of the attaching member, which construction forms two shoulders 9'. The tongue 9 is bent upwardly at 10' and then downwardly and parallel with but in a different horizontal plane than the body of the attaching member 10. This offset positioning of the tongue 9 permits the said tongue to lie flat upon the central strip 5, while the body of the attaching member 10 lies flat against the underside of the central strip 5; thus locking the attaching member against movement transversely of the basket.

Welded or otherwise suitably secured to the central strip 5, is a yoke 13 having its depending arms 14 perforated at 15 to receive a cotter pin 16, the arms 14 straddling the attaching member 10 so that the cotter pin 16 retains said attaching member in proper operative position.

Secured to the frame 7 of the carrier, are the handle-bar-attaching straps 7' by means of which the carrier is secured in proper transverse position with respect to the bicycle.

Having thus described the several parts of the carrier, it is adjustable and attached to a bicycle as follows:

The attaching member 10 is bendable at 17, so as to position the band-segment 11 at the proper angle to conform to the angle of the bicycle head. The cotter pin 16 is withdrawn from the yoke 13 and the attaching member 10 is dropped down into position shown in dotted lines in Fig. 3. The tongue 9 of the attaching member 10 is then withdrawn from its coöperative opening 8 in the central strip 5, and the attaching member 10 is moved forwardly or rearwardly of the carrier as may be required in order to accommodate the attaching member to the position of the bicycle head so as to insure the proper horizontal disposition of the basket. The tongue 9 of the attaching member 10 is then entered in the proper opening 8 in the central strip 5 to retain this fore and aft adjustment of the attaching member 10; the attaching member being then raised into position shown in full lines in Fig. 3 and between the arms of the yoke 13. Whereupon the cotter pin 16 is passed through said arms and under the attaching member 10; thus locking the attaching member in effective operative position and against movement with respect to the carrier. The head-attaching-strap 12 is then secured around the bicycle head to bring the band-segment snugly in position against the said head.

What I claim as new and desire to secure by Letters Patent of the United States, is:

1. A luggage carrier for bicycles including a receptacle and means for attaching the receptacle to the handle-bar of a bicycle, a central member on the floor or bottom of the receptacle, said central member being provided with a series of perforations, an attaching member including a tongue for selective engagement with a perforation in the central member and movable fore and aft with respect to the central member, a yoke straddling the attaching member, a pin carried by said yoke and under said attaching member and means on said attaching member for securing the same to a bicycle head.

2. A luggage carrier for bicycles including a receptacle and means for attaching the same to the handle-bar of a bicycle, a perforated member on said receptacle, an attaching member including a tongue for selective entry in a perforation in the perforated member, additional means for retaining the attaching member in proper operative position, and means on said attaching member for securing the same to the head of a bicycle.

In testimony whereof, I affix my signature.

ROBERT SCOTT CARSON.